(12) United States Patent
Wang et al.

(10) Patent No.: US 11,005,592 B2
(45) Date of Patent: May 11, 2021

(54) CONFIGURATION METHOD FOR CHANNEL STATE INFORMATION MEASUREMENT AND RELATED DEVICE

(71) Applicant: Huawei Technologies Co., Ltd., Shenzhen (CN)

(72) Inventors: Ting Wang, Shanghai (CN); Jinyao Liang, Shenzhen (CN); Shengyue Dou, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/503,246

(22) Filed: Jul. 3, 2019

(65) Prior Publication Data
US 2019/0327021 A1    Oct. 24, 2019

Related U.S. Application Data

(63) Continuation of application No. PCT/CN2017/118538, filed on Dec. 26, 2017.

(30) Foreign Application Priority Data
Jan. 6, 2017    (CN) .......................... 201710011028.9

(51) Int. Cl.
*H04L 1/06*    (2006.01)
*H04L 1/00*    (2006.01)
(Continued)

(52) U.S. Cl.
CPC .......... *H04L 1/0026* (2013.01); *H04L 5/0051* (2013.01); *H04L 5/0094* (2013.01);
(Continued)

(58) Field of Classification Search
CPC ......... H04B 7/024; H04B 7/06; H04L 1/0026; H04L 5/0051; H04L 5/0094;
(Continued)

(56) References Cited

U.S. PATENT DOCUMENTS 9,743,392 B2 *   8/2017   Nimbalker .......... H04W 72/042
9,991,942 B2 *   6/2018   Onggosanusi ....... H04B 7/0626
(Continued)

FOREIGN PATENT DOCUMENTS

CN    105101422 A    11/2015
CN    105356978 A    2/2016
(Continued)

OTHER PUBLICATIONS

"Independent and joint control of CSI-RS transmission and CSI reporting for NR MIMO," 3GPP TSG RAN WG1 Meeting #87, Reno, USA, R1-1611236, pp. 1-5, 3rd Generation Partnership Project, Valbonne, France (Nov. 4-18, 2016).
(Continued)

*Primary Examiner* — Frank Duong
(74) *Attorney, Agent, or Firm* — Leydig, Voit & Mayer, Ltd.

(57)    ABSTRACT

A method includes: generating, by a first network device, parameter information of a resource in which a channel state information CSI reference signal is located, where the parameter information is used by the second network device to determine one or more of the following information of the resource in which the CSI reference signal is located: subcarrier spacing information, cyclic prefix length information, frame structure time length information, and symbol quantity information; and sending, by the first network device, the parameter information to the second network device.

17 Claims, 4 Drawing Sheets

(51) Int. Cl.
*H04W 76/27* (2018.01)
*H04L 5/00* (2006.01)
*H04L 27/26* (2006.01)
*H04W 72/04* (2009.01)
*H04W 80/02* (2009.01)

(52) U.S. Cl.
CPC ....... *H04L 27/2607* (2013.01); *H04W 72/042* (2013.01); *H04W 76/27* (2018.02); *H04W 80/02* (2013.01)

(58) Field of Classification Search
CPC .......................... H04L 27/2607; H04W 72/04; H04W 72/042; H04W 76/27; H04W 80/02
See application file for complete search history.

(56) References Cited

U.S. PATENT DOCUMENTS

| | | | | |
|---|---|---|---|---|
| 10,164,747 | B2* | 12/2018 | Onggosanusi | H04B 7/0469 |
| 10,484,064 | B2* | 11/2019 | Onggosanusi | H04L 5/0048 |
| 10,560,859 | B2* | 2/2020 | Li | H04L 5/0091 |
| 2014/0112243 | A1 | 4/2014 | Suzuki et al. | |
| 2018/0191526 | A1 | 7/2018 | Xu | |
| 2019/0230549 | A1* | 7/2019 | Wang | H04B 7/024 |
| 2019/0335475 | A1* | 10/2019 | Liang | H04W 72/0413 |

FOREIGN PATENT DOCUMENTS

| | | |
|---|---|---|
| CN | 105471559 A | 4/2016 |
| CN | 105790905 A | 7/2016 |
| CN | 106376050 A | 2/2017 |
| CN | 106487474 A | 3/2017 |
| EP | 2945428 A1 | 11/2015 |
| WO | 2015100619 A1 | 7/2015 |

OTHER PUBLICATIONS

"3rd Generation Partnership Project; Technical Specification Group Radio Access Network; Evolved Universal Terrestrial Radio Access (E-UTRA); Multiplexing and channel coding(Release 14)," 3GPP TS 36.212 V14.1.1, pp. 1-149, 3rd Generation Partnership Project, Valbonne, France (Jan. 2017).

"3rd Generation Partnership Project; Technical Specification Group Radio Access Network; Evolved Universal Terrestrial Radio Access (E-UTRA); Physical layer procedures(Release 14)," 3GPP TS 36.213 V14.1.0, pp. 1-414, 3rd Generation Partnership Project, Valbonne, France (Dec. 2016).

"WF on CSI Framework for NR," 3GPP TSG RAN WG1 Meeting #86bis, Reno, USA, pp. 1-6, R1-1613175, 3rd Generation Partnership Project, Valbonne, France (Nov. 14-18, 2016).

* cited by examiner

CONFIGURATION METHOD FOR CHANNEL STATE INFORMATION MEASUREMENT AND RELATED DEVICE

CROSS-REFERENCE TO RELATED APPLICATIONS

This application is a continuation of International Application No. PCT/CN2017/118538, filed on Dec. 26, 2017, which claims priority to Chinese Patent Application No. 201710011028.9, filed on Jan. 6, 2017. The disclosures of the aforementioned applications are hereby incorporated by reference in their entireties.

TECHNICAL FIELD

Embodiments of the present invention relate to the field of communications technologies, and in particular, to a configuration method for channel state information measurement and a related device.

BACKGROUND

In the Long Term Evolution (LTE) Release 8 (R8)/R9, a common reference signal (CRS) is designed to measure channel quality, and user equipment (UE) may measure a channel using the CRS, so that the UE determines to reselect a cell and is handed over to a target cell. In the LTE R10, a channel state information (CSI)-reference signal (CSI-RS) is defined to further improve average cell spectrum utilization and cell-edge spectrum utilization as well as throughput rates of UEs. The CSI-RS is used for channel measurement. A precoding matrix indicator (PMI), a channel quality indicator (CQI), and a rank indication (RI) that need to be fed back by the UE to an evolved NodeB (eNB) may be calculated by measuring the CSI-RS.

In a 3GPP wireless access system, an eNB may have a plurality of antennas used for UE transmission, so that the eNB is allowed to use a multiple-input multiple-output (MIMO) technology. MIMO means that a plurality of antennas are used in both a transmitter and a receiver to improve communication performance. In the MIMO technology, a space dimension resource is used, so that a signal may obtain an array gain, multiplexing and diversity gains, and an interference cancellation gain in space without increasing system bandwidth, and a capacity and spectrum efficiency of a communications system are improved in a multiplied manner. Therefore, the MIMO technology has been favored by people since the MIMO technology emerges. In a 5th Generation (5G) mobile communication technology, the MIMO technology that can significantly improve a system capacity is still used as a key technology, to meet a transmission requirement of a new radio access technology (New RAT) for a high rate. Coordinated multipoint transmission (CoMP) in the prior art is considered as an effective method for resolving an inter-cell interference problem and increasing a throughput of an edge user. In the CoMP technology, a plurality of neighboring cells may perform joint processing or coordinate edge users to avoid interference and increasing throughputs of the edge users. In addition, in 5G, different frame structures may be used in different frequency bands.

When measuring the CSI-RS, the UE receives a reference signal based on a reference signal pattern configured by the eNB, obtains a channel matrix based on the reference signal, and further obtains channel state information and reports the channel state information to the eNB, for example, calculates an optimal PMI based on the channel matrix, calculates a CQI based on the PMI, and finally reports the selected PMI and CQI to the eNB. In the prior art, there is only one frame structure for CSI measurement. When different frame structures are used in different cells in a CoMP system, the UE cannot perform CSI measurement of a neighboring cell, causing deteriorated performance. However, in 5G, a frame structure of a serving cell in which the UE is located may be different from a frame structure of a neighboring cell, a coordinated cell, or another cell. Therefore, even if the UE knows the frame structure of the serving cell of the UE, the UE cannot perform CSI measurement of the neighboring cell.

SUMMARY

Embodiments of the present invention provide a configuration method for channel state information measurement and a related device, so that when a base station uses different frame structures in different frequency bands, UE can learn of frame structures of frequency bands in which different CSI-RSs are located, and therefore the UE implement CSI measurement of a neighboring cell.

According to a first aspect, an embodiment of the present invention provides a configuration method for channel state information measurement. The method includes: generating, by a first network device, parameter information of a resource in which a CSI reference signal is located, where the parameter information is used by the second network device to determine one or more of the following information of the resource in which the CSI reference signal is located: subcarrier spacing information, cyclic prefix length information, frame structure time length information, and symbol quantity information; and sending, by the first network device, the parameter information to the second network device.

In this embodiment of the present invention, the first network device may notify the second network device of parameter information of one or more cells in advance, and then add cell identity information when configuring a CSI-RS. The second network device may determine, based on the cell identity information, parameter information corresponding to a current CSI-RS, so as to determine a location of a resource in which the CSI-RS is located, and further receive the CSI-RS to perform CSI measurement.

In a possible design, the parameter information is used by the second network device to determine a pilot pattern of the CSI reference signal, or the parameter information is used by the second network device to determine a time domain and/or frequency domain resource occupied by the CSI reference signal.

In a possible design, the sending, by the first network device, the parameter information to the second network device includes: sending, by the first network device, the parameter information to the second network device using radio resource control (RRC) signaling, Medium Access Control (MAC) signaling, or downlink control information (DCI) signaling; or sending, by the first network device, parameter information indication information to the second network device using RRC signaling, MAC signaling, or DCI signaling, where the parameter information indication information is used by the second network device to determine the parameter information from a plurality of groups of parameter information.

In a possible design, the parameter information includes frequency domain indication information, and the frequency domain indication information indicates a frequency domain to which the parameter information is applicable. The frequency domain indication information is added, so that parameter information corresponding to different frequency bands may be indicated.

In a possible design, the method further includes: sending, by the first network device, frequency domain indication information corresponding to the parameter information to the second network device, where the frequency domain indication information indicates a frequency domain to which the parameter information is applicable. The frequency domain indication information is added, so that parameter information corresponding to different frequency bands may be indicated.

In a possible design, the parameter information includes one or more of the following information: the subcarrier spacing information, the cyclic prefix length information, the frame structure time length information, and the symbol quantity information.

In a possible design, the parameter information includes CSI reference signal identification information, and the CSI reference signal identification information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that correspond to a current serving cell of the second network device; or the CSI reference signal identification information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that are obtained during initial access of the second network device.

In a possible design, the parameter information includes cell identity information, and the cell identity information indicates that one or more of the following information: the subcarrier spacing information, the cyclic prefix length information, the frame structure time length information, and the symbol quantity information of the resource in which the CSI reference signal is located is one or more of the following information: subcarrier spacing information, cyclic prefix length information, frame structure time length information, and symbol quantity information that correspond to the cell identity information. The cell identity information is added, so that parameter information corresponding to different cells may be indicated.

According to a second aspect, an embodiment of the present invention provides a configuration method for channel state information measurement. The method includes: receiving, by a second network device, parameter information that is of a resource in which a CSI reference signal is located and that is sent by a first network device; and determining, by the second network device based on the parameter information, one or more of the following information of the resource in which the CSI reference signal is located: subcarrier spacing information, cyclic prefix length information, frame structure time length information, and symbol quantity information.

According to this embodiment of the present invention, the first network device may notify the second network device of parameter information of one or more cells in advance, and then add cell identity information when configuring a CSI-RS. The second network device may determine, based on the cell identity information, parameter information corresponding to a current CSI-RS, so as to determine a location of a resource in which the CSI-RS is located, and further receive the CSI-RS to perform CSI measurement.

In a possible design, the method further includes: determining, by the second network device, a pilot pattern of the CSI reference signal based on the parameter information; or determining, by the second network device based on the parameter information, a time domain and/or frequency domain resource occupied by the CSI reference signal.

In a possible design, the receiving, by a second network device, parameter information that is of a resource in which a CSI reference signal is located and that is sent by a first network device includes: receiving, by the second network device, the parameter information that is of the resource in which the CSI reference signal is located and that is sent by the first network device using RRC signaling, MAC signaling, or DCI signaling; or receiving, by the second network device, parameter information indication information that is sent by the first network device using RRC signaling, MAC signaling, or DCI signaling, and determining, based on the parameter information indication information, the parameter information of the resource in which the CSI reference signal is located from a plurality of groups of parameter information.

In a possible design, the parameter information includes frequency domain indication information, and the frequency domain indication information indicates a frequency domain to which the parameter information is applicable; and after the receiving, by a second network device, parameter information sent by a first network device, the method further includes: determining, by the second network device based on the frequency domain indication information, the frequency domain to which the parameter information is applicable. The frequency domain indication information is added, so that parameter information corresponding to different frequency bands may be indicated.

In a possible design, the method further includes: receiving, by the second network device, frequency domain indication information that corresponds to the parameter information and that is configured and sent by the first network device; and determining, by the second network device based on the frequency domain indication information, a frequency domain to which the parameter information is applicable. The frequency domain indication information is added, so that parameter information corresponding to different frequency bands may be indicated.

In a possible design, the parameter information includes one or more of the following information: the subcarrier spacing information, the cyclic prefix length information, the frame structure time length information, and the symbol quantity information.

In a possible design, the parameter information includes CSI reference signal identification information, and the determining, by the second network device based on the parameter information, one or more of the following information of the resource in which the CSI reference signal is located: subcarrier spacing information, cyclic prefix length information, frame structure time length information, and symbol quantity information includes: determining, by the second network device based on the CSI reference signal identification information, one or more of the following information: subcarrier spacing information, cyclic prefix length information, frame structure time length information, and symbol quantity information of a serving cell as one or more of the following information of the resource in which the CSI reference signal is located: the subcarrier spacing information, the cyclic prefix length information, the frame structure time length information, and the symbol quantity information; or determining, by the second network device based on the CSI reference signal identification information, one or more of the following information: subcarrier spacing information, cyclic prefix length information, frame structure time length information, and symbol quantity information that are obtained during initial access as one or more of the following information of the resource in which the CSI reference signal is located: the subcarrier spacing information, the cyclic prefix length information, the frame structure time length information, and the symbol quantity information.

In a possible design, the parameter information includes cell identity information, and the determining, by the second network device based on the parameter information, one or more of the following information of the resource in which the CSI reference signal is located: subcarrier spacing information, cyclic prefix length information, frame structure time length information, and symbol quantity information includes: determining, by the second network device, one or more of the following information: subcarrier spacing information, cyclic prefix length information, frame structure time length information, and symbol quantity information that correspond to the cell identity information as one or more of the following information of the resource in which the CSI reference signal is located: the subcarrier spacing information, the cyclic prefix length information, the frame structure time length information, and the symbol quantity information. The cell identity information is added, so that parameter information corresponding to different cells may be indicated.

According to a third aspect, a network device is provided. The network device is a first network device, and the first network device may include a processor, a transmitter, and a memory. The memory is configured to store a program and data, and the processor invokes the program in the memory to perform the configuration method for channel state information measurement according to any implementation of the first aspect.

According to a fourth aspect, a network device is provided. The network device is a second network device, and the second network device may include a processor, a receiver, and a memory. The memory is configured to store a program and data, and the processor invokes the program in the memory to perform the configuration method for channel state information measurement according to any implementation of the second aspect.

According to a fifth aspect, a network device is provided. The network device may include function units configured to perform the configuration method for channel state information measurement according to the first aspect.

According to a sixth aspect, user equipment is provided. The user equipment may include function units configured to perform the configuration method for channel state information measurement according to the second aspect.

According to a seventh aspect, a communications system is provided, including a first network device and a second network device. The first network device may be the first network device according to the third aspect or the fifth aspect, and the second network device may be the second network device according to the fourth aspect or the sixth aspect.

According to an eighth aspect, an embodiment of the present invention provides a computer storage medium, configured to store a computer software instruction used by the foregoing first network device. The computer software instruction includes a program used to perform the first aspect and designed for the first network device.

According to a ninth aspect, an embodiment of the present invention provides a computer storage medium, configured to store a computer software instruction used by the foregoing second network device. The computer software instruction includes a program used to perform the second aspect and designed for the second network device.

These aspects or other aspects of the embodiments of the present invention are clearer and easier to understand in descriptions of the following embodiments.

DESCRIPTION OF EMBODIMENTS

Terms used in an implementation part of the present invention are merely used to explain specific embodiments of the present invention, but are not intended to limit the embodiments of the present invention.

Figure 1:
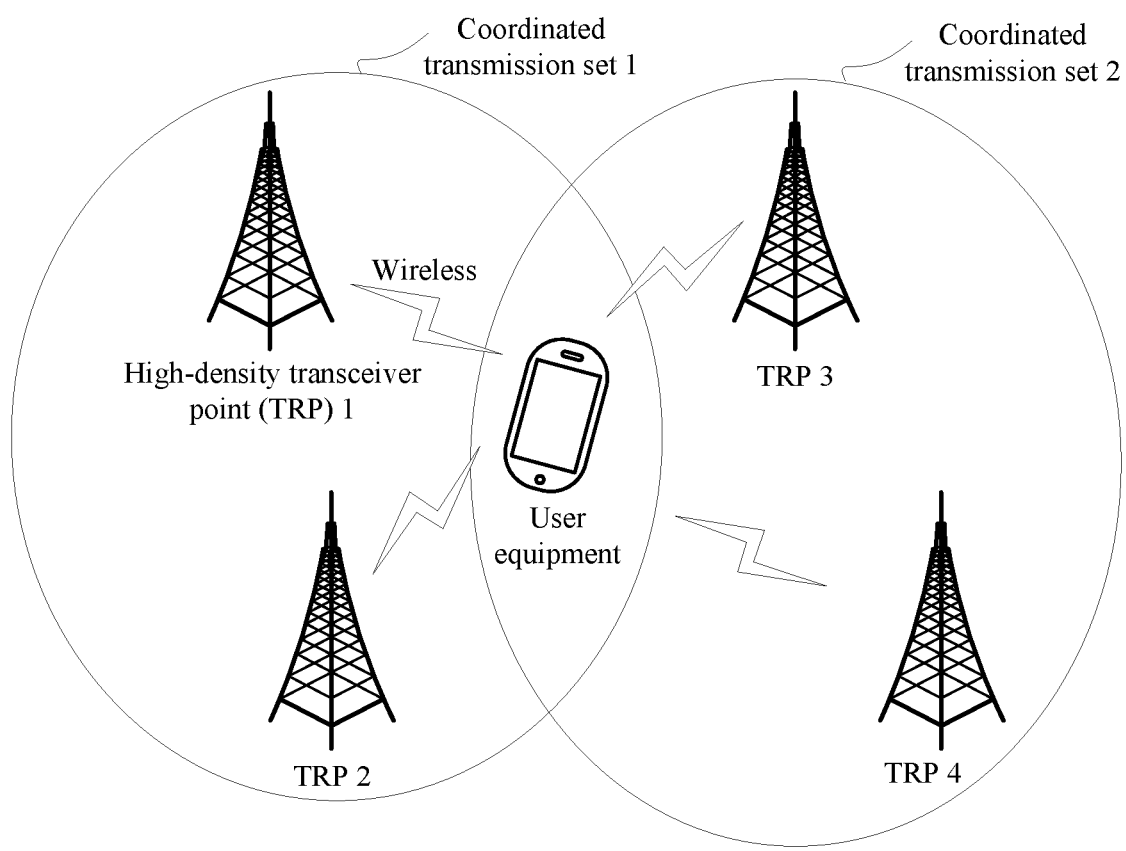
FIG. 1 is a schematic diagram of an application scenario according to an embodiment of the present invention.

FIG. 1 is a schematic diagram of an application scenario according to an embodiment of the present invention. FIG. 1 shows a super cell (hypercell) including high-density transceiver points (TRP). As shown in FIG. 1, in a high-density TRP transmission scenario, one user equipment may communicate with a plurality of transceiver points, to form a user equipment-centered communications system (UE-cell-center-like). Usually, a plurality of transceiver points adjacent to each other in location may be put into one group, to form a group of transceiver points circled by a dotted line in the accompanying drawing. The group of transceiver points may be referred to as a TRP set or a coordinated transmission set. It should be noted that a division manner of the TRP set is not limited to a location-based division manner, and may alternatively be another division manner, for example, TRPs having a strong correlation with each other are put into one group. This is not limited in this embodiment of the present invention.

In specific implementation, the transceiver point may be a base transceiver station (BTS) in a GSM system or a CDMA system, may be a NodeB in a WCDMA system, may be an evolved NodeB (eNB or eNodeB) in an LTE system, or may be a network device such as a gNB or a micro gNB in a future 5G network. This is not limited in this embodiment of the present invention.

In specific implementation, the user equipment may support a CoMP transmission mode, that is, the user equipment may communicate with two or more transceiver points in the accompanying drawing. The user equipment may be referred to as an access terminal, a subscriber unit, a subscriber station, a mobile station, a mobile console, a remote station, a remote terminal, a mobile device, a user terminal, a terminal, a wireless communications device, a user agent, or a user apparatus. In specific implementation, the user equipment may be mobile or fixed. The user equipment may be a cellular phone, a cordless telephone set, a Session Initiation Protocol (SIP) phone, a wireless local loop (WLL) station, a personal digital assistant (PDA), a handheld device or a computing device having a wireless communication function, another processing device connected to a wireless modem, an in-vehicle device, a wearable device, user equipment in a future 5G network, or the like. As an Internet of Things (IoT) technology rises, more devices previously having no communication function, for example but not limited to a household appliance, a transportation tool, a tool device, a service device, and a service facility, start to be configured with a wireless communications unit to obtain a wireless communication function, so that the devices may access a wireless communications network and be remotely controlled. This type of device has the wireless communication function with the wireless communications unit being configured, and therefore may also be used as the foregoing user equipment.

When the user equipment moves at a high speed, an environment in which the user equipment is located constantly changes. In a high-density TRP scenario, the user equipment may be handed over from one TRP to another TRP, or may be handed over from one TRP set to another TRP set. A reference signal resource that corresponds to the user equipment and that is used for channel measurement also needs to be changed accordingly.

In the prior art, there is only one fixed frame structure for CSI measurement. When different frame structures are used in different cells, the user equipment cannot perform CSI measurement, causing deteriorated performance.

In the embodiments of the present invention, a first network device includes but is not limited to the transceiver point, and a second network device includes but is not limited to the user equipment.

The embodiments of the present invention are used to resolve a problem that different parameters (numerology) and/or frame structures are used in different frequency bands in NR. Different numerologies and/or frame structures determine different subcarrier spacings, CP lengths, frame structure time lengths, symbol quantities, or the like, and therefore different CSI-RS pilot patterns are generated. In this case, if the user equipment is notified of a numerology and/or a frame structure of a frequency band in which a current CSI-RS is located, the user equipment may learn of a CSI-RS pilot pattern corresponding to the current frequency band, or a time/frequency domain resource in which the CRI-RS is located, and further may receive the CSI-RS on a corresponding resource to perform CSI measurement.

To resolve a problem that different frame structures are used in different frequency bands in NR, the embodiments of the present invention provide a configuration method for channel state information measurement. In the embodiments of the present invention, the first network device notifies the second network device of parameter information of a resource in which a current CSI-RS is located, to enable the second network device to learn of a frame structure of the resource in which the current CSI-RS is located, so that the second network device implement CSI measurement, thereby meeting a CSI measurement requirement of the second network device in different frequency bands.

The following describes the configuration method for channel state information measurement provided in the embodiments of the present invention in detail with reference to an accompanying drawing.

Figure 2:
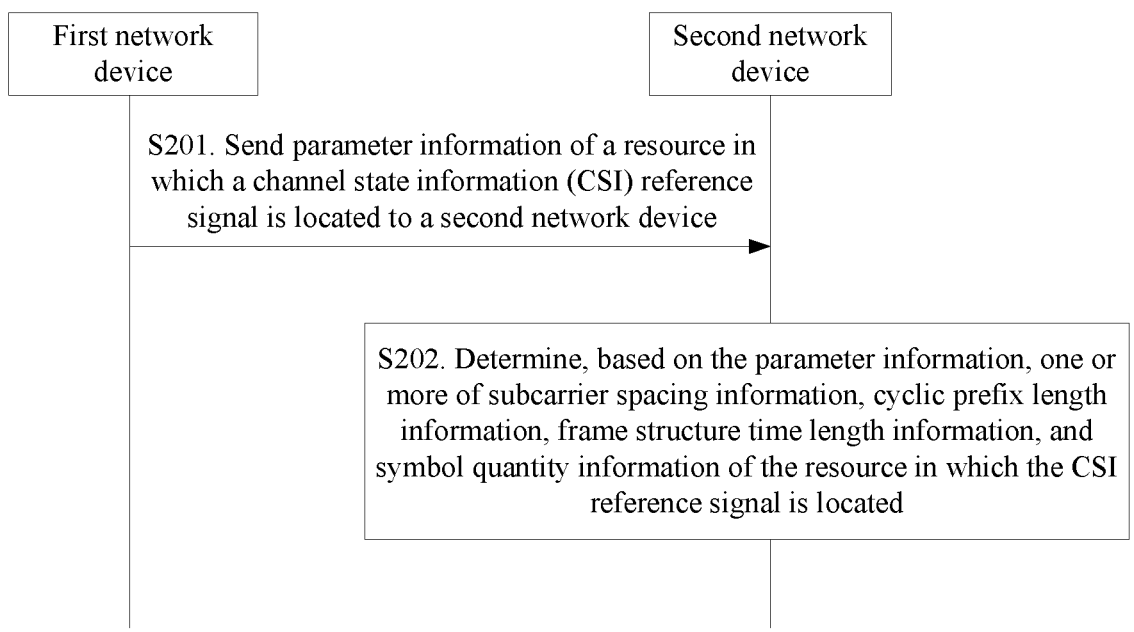
FIG. 2 is a schematic flowchart of a configuration method for channel state information measurement and reporting according to an embodiment of the present invention.

FIG. 2 is a schematic flowchart of a configuration method for channel state information measurement and reporting according to an embodiment of the present invention. The method includes but is not limited to the following steps.

S201: A first network device sends parameter information of a resource in which a CSI reference signal is located to a second network device.

In this embodiment of the present invention, the parameter information is used by the second network device to determine one or more of the following information of the resource in which the CSI reference signal is located: subcarrier spacing information, cyclic prefix length information, frame structure time length information, and symbol quantity information.

In this embodiment of the present invention, the parameter information is specifically numerology information and/or frame structure information, and may indicate a pilot pattern in which a resource of CSI-RS is located or a time domain and/or frequency domain resource occupied by the CSI-RS.

Specifically, the parameter information is used by the second network device to determine a pilot pattern of the CSI reference signal, or the parameter information is used by the second network device to determine the time domain and/or frequency domain resource occupied by the CSI reference signal.

In an optional implementation, parameter information of a resource in which a current CSI reference signal is located may be directly notified by the first network device to the second network device using signaling. For example, the first network device configures, for the second network device using radio resource control (RRC) signaling or Medium Access Control (MAC) signaling, the parameter information of the resource in which the CSI reference signal is located, or sends the parameter information of the resource in which the CSI reference signal is located to the second network device using downlink control information (DCI) signaling. In this case, the parameter information is one or more of the following information: the subcarrier spacing information, the cyclic prefix length information, the frame structure time length information, and the symbol quantity information.

In another optional implementation, the first network device may notify the second network device of a plurality of groups of parameter information in advance, and then notify, using signaling, the second network device of parameter information corresponding to a resource in which a CSI reference signal in a current frequency band is located. Specifically, the first network device configures parameter information indication information for the second network device using RRC signaling or MAC signaling, or sends parameter information indication information to the second network device using DCI signaling. The parameter information indication information is used by the second network device to determine the parameter information of the resource in which the CSI reference signal is located from the plurality of groups of parameter information. In this case, the first network device may predefine information about mapping between different bit information and different parameter information, or the first network device sends information about mapping between different bit information and different parameter information to the second network device. Then the first network device configures, for the second network device using RRC signaling or MAC signaling, bit information corresponding to the current frequency band, or sends, using DCI signaling, bit information corresponding to the current frequency band to the second network device, to notify the second network device of parameter information corresponding to a current CSI-RS. Herein, the parameter information includes one or more of the following information: the subcarrier spacing information, the cyclic prefix length information, the frame structure time length information, and the symbol quantity information. For example, the first network device indicates different parameters using different bit information, and this is described below using an example. Different subcarrier spacings may be indicated using 2 bits or another quantity of bits. For example, 00 indicates a 15 kHz subcarrier spacing, 01 indicates a 30 kHz subcarrier spacing, and 10 indicates a 60 kHz subcarrier spacing. By analogy, different bit values may also indicate other different subcarrier spacings. For an example, refer to Table 1.

TABLE 1

| Bit information | Subcarrier spacing |
| --- | --- |
| 00 | 15 kHz |
| 01 | 30 kHz |
| 10 | 60 kHz |
| 11 | Reserved |

Different cyclic prefix (CP) length information may be indicated using 1 bit or another quantity of bits. For example, 0 indicates a normal CP, and 1 indicates an extended CP. By analogy, different bit values may also indicate other CP lengths. For an example, refer to Table 2.

TABLE 2

| Bit information | CP length |
| --- | --- |
| 0 | Normal CP |
| 1 | Extended CP |

Different frame structure time lengths may be indicated using 2 bits or another quantity of bits. For example, 00 indicates a 1 ms subframe, 01 indicates a 0.5 ms slot (slot), and 10 indicates a 0.25 ms mini slot (mini slot). By analogy, different bit values may also indicate other different time lengths. For an example, refer to Table 3.

TABLE 3

| Bit information | Frame structure time length |
| --- | --- |
| 00 | 1 ms |
| 01 | 0.5 ms |
| 10 | 0.25 ms |

Different symbol quantities may be indicated using 2 bits or another quantity of bits. For example, 00 indicates 14 symbols, 01 indicates seven symbols, 10 indicates four symbols, and 11 indicates two symbols. By analogy, different bit values may also indicate other different symbol quantities. For an example, refer to Table 4.

TABLE 4

| Bit information | Symbol quantity |
| --- | --- |
| 00 | 14 |
| 01 | 7 |
| 10 | 4 |
| 11 | 2 |

Alternatively, information of several bits may be used together to indicate one or more of the following information: the subcarrier spacing information, the cyclic prefix length information, the frame structure time length information, and the symbol quantity information. For example, 3 bits or another quantity of bits are used for indication. An example is as follows: 000 indicates that a subcarrier spacing is 15 kHz, a CP length is a normal CP, and a symbol quantity is 14; 001 indicates that a subcarrier spacing is 30 kHz, a CP length is a normal CP, and a symbol quantity is 7; and 010 indicates that a subcarrier spacing is 60 kHz, a CP length is a normal CP, and a symbol quantity is 4. By analogy, different bit values may also indicate other different subcarrier spacing values and/or other different CP length values and/or other different symbol quantity values. For an example, refer to Table 5.

TABLE 5

| Bit information | Parameter information |
| --- | --- |
| 000 | The subcarrier spacing is 15 kHz, the CP length is a normal CP, and the symbol quantity is 14. |
| 001 | The subcarrier spacing is 30 kHz, the CP length is a normal CP, and the symbol quantity is 7. |
| 010 | The subcarrier spacing is 60 kHz, the CP length is a normal CP, and the symbol quantity is 4. |
| 011 | The subcarrier spacing is 15 kHz, the CP length is an extended CP, and the symbol quantity is 12. |
| 100 | The subcarrier spacing is 30 kHz, the CP length is an extended CP, and the symbol quantity is 6. |
| 101 | The subcarrier spacing is 60 kHz, the CP length is an extended CP, and the symbol quantity is 3. |
| 110 | The subcarrier spacing is 30 kHz, the CP length is a normal CP, and the symbol quantity is 4. |
| 111 | The subcarrier spacing is 60 kHz, the CP length is a normal CP, and the symbol quantity is 2. |

In addition, a plurality of different types of parameter information may also be predefined between the first network device and the second network device. Then during CSI-RS configuration, the first network device sends the parameter information indication information to the second network device to indicate a group of parameter information that specifically corresponds to the resource in which the current CSI-RS is located.

The bit values and the parameter information in Table 1 to Table 5 are merely examples for description, and other values and/or parameter information are also applicable. This is not limited herein in this embodiment of the present invention.

S202: The second network device determines, based on the parameter information, one or more of the following information of the resource in which the CSI reference signal is located: subcarrier spacing information, cyclic prefix length information, frame structure time length information, and symbol quantity information.

In an optional implementation, the parameter information is one or more of the following information: the subcarrier spacing information, the cyclic prefix length information, the frame structure time length information, and the symbol quantity information. The second network device may directly obtain one or more of the following information: the subcarrier spacing information, the cyclic prefix length information, the frame structure time length information, and the symbol quantity information from the first network device.

In another optional implementation, the first network device sends different bit information and corresponding parameter information (one or more of the following information: the subcarrier spacing information, the cyclic prefix length information, the frame structure time length information, and the symbol quantity information) to the second network device in advance, and the second network device stores a mapping relationship between different bit information and different parameter information. Then the first network device sends, to the second network device, bit information corresponding to parameter information of a resource in which a currently transmitted CSI-RS is located, and the second network device queries the mapping relationship based on the bit information, to determine the parameter information of the resource in which the currently transmitted CSI-RS is located. For example, the first network device sends a segment of bits 0010000 to the second network device. A first bit and a second bit in the segment of bits are used to indicate a subcarrier spacing, a third bit indicates a cyclic prefix length, a fourth bit and a fifth bit are used to indicate a frame structure time length, and a sixth bit and a seventh bit are used to indicate a symbol quantity. After receiving the segment of bits, the second network device queries Table 1 to Table 4, and determines that the parameter information corresponding to the current CSI-RS is separately as follows: The subcarrier spacing is 15 kHz, the cyclic prefix is a normal CP, the frame structure time length is 1 ms, and the symbol quantity is 14. The second network device may determine, based on the group of parameter information, a pilot pattern of the resource in which the current CSI-RS is located or a time domain and/or frequency domain resource occupied by the current CSI-RS, so as to perform corresponding CSI measurement.

In another optional implementation, for the parameter information, information of several bits may be used together to indicate one or more of the following information: the subcarrier spacing information, the cyclic prefix length information, the frame structure time length information, and the symbol quantity information. For example, for Table 5, the first network device sends a segment of bits 011 to the second network device. After receiving the segment of bits, the second network device queries Table 5, and determines that the parameter information corresponding to the current CSI-RS is separately as follows: The subcarrier spacing is 15 kHz, the CP length is an extended CP, and the symbol quantity is 12. The second network device may determine, based on the group of parameter information, a pilot pattern of the resource in which the current CSI-RS is located or a time domain and/or frequency domain resource occupied by the current CSI-RS, so as to perform corresponding CSI measurement.

RRC signaling in higher layer signaling is used as an example, and a signaling indication in existing 36.331 is used as an example (certainly, the following example is also applicable to other protocol signaling, and this is not limited herein). An example is as follows: Numerology information (numerologyConfig) and/or frame structure information (frameStructureConfig) are carried in CSI-RS configuration information. The numerology information and/or the frame structure information may indicate parameter information corresponding to a current CSI-RS. For example, the numerologyConfig includes an identifier 0 to an identifier 31, and each identifier corresponds to one group of parameter information. The second network device may determine, based on the numerologyConfig, the parameter information corresponding to the current CSI-RS. Alternatively, the frameStructureConfig includes an identifier 0 to an identifier 31, and each identifier corresponds to one group of parameter information. The second network device may determine, based on the frameStructureConfig, the parameter information corresponding to the current CSI-RS. Alternatively, indication information of parameter information is carried in CSI-RS configuration information, for example, indication information of at least one of subcarrier spacing information (SubcarrierSpacingConfig), time length information (timeUintConfig), CP length information (CPConfig), and/or symbol quantity information (symbolNumConfig). For example, the SubcarrierSpacingConfig may be 15 kHz, 30 kHz, 60 kHz, or the like. The second network device may determine, based on the SubcarrierSpacingConfig, a subcarrier spacing corresponding to a current CSI-RS. Likewise, the timeUintConfig may be 1 ms, 0.5 ms, 0.25 ms, or the like. The second network device may determine, based on the timeUintConfig, a frame structure time length corresponding to the current CSI-RS. Alternatively, the timeUintConfig may be a subframe, a slot, a mini slot, or the like, and a corresponding frame structure time length is 1 ms, 0.5 ms, 0.25 ms, or the like. Therefore, the second network device may determine, based on the timeUintConfig, a frame structure time length corresponding to the current CSI-RS. Likewise, the CPConfig may be an NZP, an EZP, or the like. The second network device may determine, based on the CPConfig, CP length information corresponding to the current CSI-RS. Likewise, the symbolNumConfig may be 14, 12, 7, 6, 4, 3, 2, or the like. The second network device may determine, based on the symbolNumConfig, a symbol quantity corresponding to the current CSI-RS. In an example, for an RRC signaling configuration, refer to Table 6.

TABLE 6

```
CSI-RS-ConfigNZP-r11 ::=      SEQUENCE {
    csi-RS-ConfigNZPId-r11        CSI-RS-ConfigNZPId-r11,
    antennaPortsCount-r11         ENUMERATED {an1, an2, an4, an8},
    resourceConfig-r11            INTEGER (0..31),
    numerologyConfig          INTEGER (0..31),
    (or frameStructureConfigINTEGER (0..31),)
    (or
        SubcarrierSpacingConfig       ENUMERATED {15kHz, 30kHz, 60kHz,...},
        timeUnitConfig                ENUMERATED {1ms, 0.5ms, 0.25ms,...},
or
                                      ENUMERATED {subframe, slot, mini slot,...},
        CPConfig                      ENUMERATED {NCP, ECP,...},
        symbolNumConfig               ENUMERATED {14,12,7,6,4,3,2,...}, )
    subframeConfig-r11            INTEGER (0..154),
    scramblingIdentity-r11        INTEGER (0..503),
```

TABLE 6-continued

```
qcl-CRS-Info-r11              SEQUENCE {
    qcl-ScramblingIdentity-r11    INTEGER (0..503),
    crs-PortsCount-r11            ENUMERATED {n1, n2, n4, spare1},
    mbsfn-SubframeConfigList-r11CHOICE {
        release                       NULL,
        setup                         SEQUENCE {
            subframeConfigList            MBSFN-SubframeConfigList
        }
    }                                                       OPTIONAL  -- Need
ON
    }                                                       OPTIONAL, -- Need
OR
    ...,
    [[ eMIMO-Info-r13             CHOICE {
        release                       NULL,
        setup                         SEQUENCE {
            nzp-resourceConfigList-r13    SEQUENCE (SIZE (2..8)) OF
ResourceConfig-r13,
            cdmType                       ENUMERATED {cdm2, cdm4}
    OPTIONAL  -- Need OR
        }
    }                                                       OPTIONAL  -- Need
ON
    ]]
                                  }
```

It should be noted that values (a value) and names (a name) of the subcarrier spacing information (SubcarrierSpacingConfig), the time length information (timeUintConfig), the CP length information (CPConfig), and/or the symbol quantity information (symbolNumConfig) are merely examples. In an actual application, names and values of these parameters are not specifically limited.

In an optional implementation, the parameter information may include frequency domain indication information, and the frequency domain indication information indicates a frequency domain to which the parameter information is applicable. After receiving the parameter information, the second network device may determine, based on the frequency domain indication information, one or more of the following information: subcarrier spacing information, cyclic prefix length information, frame structure time length information, and symbol quantity information of a CSI-RS in a current frequency domain.

In another optional implementation, the parameter information may include no frequency domain indication information. If the parameter information includes no frequency domain indication information, frequency domain indication information needs to be separately configured during configuration of the parameter information, that is, parameter information corresponding to different frequency domains is configured. For example, the first network device configures the frequency domain indication information (frequencyConfigList), to indicate a division status of a frequency band. One or more pieces of parameter information may be configured for a divided frequency band. If there is no frequency domain indication information, it is considered by default that a frequency domain is a full-bandwidth frequency band or another predefined frequency band. This is not specifically limited herein.

Specific description is as follows: Downlink control information DCI in physical layer signaling is used as an example, and a signaling indication in existing 36.212 is used as an example (certainly, the following example is also applicable to other protocol signaling, and this is not limited herein). An example is as follows: CSI-RS configuration information is configured using the DCI. Parameter information corresponding to a CSI-RS and frequency domain indication information to which the parameter information is applicable are indicated in the CSI-RS configuration information. Specific description is as follows: The frequencyConfigList includes one or more frequency Configs, a numerologyConfigList includes one or more Numerology Configs (for example, a value may be any value ranging from 0 to 31), and a frameStructureConfigList includes one or more Frame Structure Configs (for example, a value may be any value ranging from 0 to 31). A SubcarrierSpacingConfigList includes one or more Subcarrier Spacing Configs (for example, a value may be 15 kHz, 30 kHz, 60 kHz, or the like). A timeUintConfigList includes one or more Time Unit Configs (for example, a value may be 1 ms, 0.5 ms, 0.25 ms, or the like). A CPConfigList includes one or more CP Configs (for example, a value may be an NZP, an EZP, or the like). A symbolNumConfigList includes one or more Symbol Num Configs (for example, a value may be 14, 12, 7, 6, 4, 3, 2, or the like).

Herein, each frequency Config corresponds to one Numerology Config value and/or one Frame Structure Config value. Alternatively, each frequency Config corresponds to one Subcarrier Spacing Config value, one Time Unit Config value, one CP Config value, and one Symbol Num Config value. A CSI configuration ID indicates a CSI configuration identifier, including one or more pieces of configuration information of a measurement set, an RS set, or a report set. The frequency domain indication information (Frequency Config) indicates frequency domain information. The Numerology Config indicates parameter configuration information. Frame structure configuration information (Frame Structure Config) indicates the frame structure configuration information. The Subcarrier Spacing Config indicates subcarrier spacing configuration information. The Time Unit Config indicates frame structure time length configuration information. The CP Config indicates CP length configuration information. The Symbol Num Config indicates symbol quantity configuration information. The frequency domain indication information and numerology information and/or frame structure information that correspond to the CSI configuration information are/is configured, so that the second network device may determine a location of a resource in which the CSI-RS is located in a frequency domain range, so as to receive the CSI-RS to perform CSI measurement. In an example, for a specific signaling configuration, refer to Table 7.

TABLE 7

```
CSI-RS-ConfigNZP-r11 ::=      SEQUENCE {
    csi-RS-ConfigNZPId-r11        CSI-RS-ConfigNZPId-r11,
    antennaPortsCount-r11         ENUMERATED {an1, an2, an4, an8},
    resourceConfig-r11            INTEGER (0..31),
    frequencyConfigList
    numerologyConfigList          sequence of INTEGER (0..31),
    (or frameStructureConfigListsequence of INTEGER (0..31),)
    (or
        SubcarrierSpacingConfigList   sequence of ENUMERATED {15kHz, 30kHz,
60kHz,...},
        timeUnitConfigList            sequence of ENUMERATED {1ms, 0.5ms,
0.25ms,...}, or
                                      sequence of ENUMERATED {subframe, slot, mini
slot,...},
        CPConfigList                  sequence of ENUMERATED {NCP, ECP,...},
        symbolNumConfigList           sequence of ENUMERATED
{14,12,7,6,4,3,2,...},   )
    subframeConfig-r11            INTEGER (0..154),
    scramblingIdentity-r11        INTEGER (0..503),
    qcl-CRS-Info-r11              SEQUENCE {
        qcl-ScramblingIdentity-r11    INTEGER (0..503),
        crs-PortsCount-r11            ENUMERATED {n1, n2, n4, spare1},
        mbsfn-SubframeConfigList-r11CHOICE {
            release                       NULL,
            setup                         SEQUENCE {
                subframeConfigList            MBSFN-SubframeConfigList
            }
        }                                                     OPTIONAL  -- Need
ON
    }                                                         OPTIONAL, -- Need
OR
    ...,
    [[ eMIMO-Info-r13             CHOICE {
        release                       NULL,
        setup                         SEQUENCE {
            nzp-resourceConfigList-r13    SEQUENCE (SIZE (2..8)) OF ResourceConfig-
r13,
            cdmType                       ENUMERATED {cdm2, cdm4}
        OPTIONAL    -- Need OR
        }
    }                                                         OPTIONAL  -- Need
ON
    ]]
}}
```

The frequency domain indication information (frequencyConfigList) indicates a division status of a frequency band. One or more pieces of numerology information and/or frame structure information need to be configured for each divided frequency band, or one or more of the following information: subcarrier spacing information, cyclic prefix length information, frame structure time length information, and symbol quantity information need to be configured for each frequency band.

It should be noted that a division manner, a naming manner, and a value range of the frequency domain indication information are not specifically limited in this embodiment of the present invention.

According to this embodiment of the present invention, the first network device notifies the second network device of the parameter information of the resource in which the current CSI-RS is located, and therefore the second network device may determine a location of the resource in which the CSI-RS is located, so as to receive the CSI-RS to perform CSI measurement.

Further, the parameter information includes CSI reference signal identification information, and the CSI reference signal identification information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that correspond to a current serving cell of the second network device; or the CSI reference signal identification information indicates that one or more of the following information of the resource in which the CSI reference signal is located: the subcarrier spacing information, the cyclic prefix length information, the frame structure time length information, and the symbol quantity information is located is one or more of the following information: subcarrier spacing information, cyclic prefix length information, frame structure time length information, and symbol quantity information that are obtained during initial access of the second network device. Specifically, for a CSI-RS of a serving cell, the second network device may determine, through initial access, parameter information used by the second network device. However, during configuration of the CSI-RS, the second network device does not know which one is a CSI-RS configuration of the serving cell, and which one is a CSI-RS configuration of another cell. When sending the CSI-RS configuration information, the first network device may add the CSI reference signal identification information to indicate related information about a CSI-RS configuration. For example, an identifier indicating whether a CSI-RS configuration is of the serving cell is added. Using the identifier, the second network device may determine whether a current CSI reference signal is a CSI-RS of the serving cell. If the current CSI reference signal is the CSI-RS of the serving cell, the second network device determines the CSI-RS configuration of the serving cell as parameter information of a resource in which the current CSI-RS is located. Alternatively, an identifier indicating whether a configuration is of access parameter information is added. Using the identifier, the second network device may determine whether the parameter information of the resource in which the CSI-RS is located is consistent with information determined by the second network device during initial access, or information determined using a higher layer signaling (such as RRC signaling) configuration or a physical layer signaling configuration. If the parameter information of the resource in which the CSI-RS is located is consistent with the information determined by the second network device during initial access, or the information determined using the higher layer signaling configuration or the physical layer signaling configuration, the second network device receives the CSI-RS based on previously determined numerology information and/or frame structure information to perform CSI measurement.

In an example, for a signaling configuration of the CSI reference signal identification information, refer to Table 8. A field "IsservingCellConfig" is carried in signaling. If the field is configured as True, the second network device may learn that the parameter information of the resource in which the current CSI-RS is located is consistent with parameter information corresponding to the current serving cell of the second network device.

TABLE 8

| | |
|---|---|
| CSI-RS-ConfigNZP-r11 ::= | SEQUENCE { |
| csi-RS-ConfigNZPId-r11 | CSI-RS-ConfigNZPId-r11, |
| IsservingCellConfig | BOOL {True,false}, |
| antennaPortsCount-r11 | ENUMERATED {an1, an2, an4, an8}, |
| resourceConfig-r11 | INTEGER (0..31), |
| ... | |
| } | |

Alternatively, in an example, for a signaling configuration of the CSI reference signal identification information, refer to Table 9. A field "IsInitialConfig" is carried in signaling. If the field is configured as True, the second network device may learn that the parameter information of the resource in which the current CSI-RS is located is consistent with the parameter information determined during initial access of the second network device.

TABLE 9

| | |
|---|---|
| CSI-RS-ConfigNZP-r11 ::= | SEQUENCE { |
| csi-RS-ConfigNZPId-r11 | CSI-RS-ConfigNZPId-r11, |
| IsInitialConfig | BOOL {Ture,false}, |
| antennaPortsCount-r11 | ENUMERATED {an1, an2, an4, an8}, |
| resourceConfig-r11 | INTEGER (0..31), |
| ... | |
| } | |

According to this embodiment of the present invention, the first network device indicates whether the parameter information of the resource in which the current CSI-RS is located is the same as numerology information and/or frame structure information determined during initial access or determined based on previously configured information. If the parameter information of the resource in which the current CSI-RS is located is the same as the numerology information and/or the frame structure information determined during initial access or determined based on the previously configured information, signaling overheads used by the first network device to notify the second network device again may be saved.

Further, the parameter information includes cell identity information, and the cell identity information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that correspond to the cell identity information. Specifically, the first network device notifies, in advance, the second network device of parameter information corresponding to one or more pieces of cell identity information. After receiving the information, the second network device may determine a numerology information and/or frame structure information of one or more cells. Then during CSI-RS configuration, the first network device needs to send only the cell identity information to the second network device. The second network device may learn, based on the cell identity information, of the parameter information corresponding to the resource in which the current CSI-RS is located, determine a pilot pattern or a time/frequency domain resource of the current CSI-RS based on the parameter information, and further receive the CSI-RS to for perform CSI measurement.

For example, the first network device notifies the second network device of a numerology information and/or frame structure information of one or more cells using higher layer public signaling (such as RRC signaling or MAC signaling). A specific example is as follows: The first network device notifies, using higher layer public signaling, the second network device of cell identity information Cell_ID, and parameter information of a carrier corresponding to the cell. Specific parameter information may be numerology information and/or frame structure information, or may be one or more of the following information: specific subcarrier spacing information, cyclic prefix length information, frame structure time length information, and symbol quantity information. Then the first network device adds the cell identity information and/or a carrier configuration identifier to the CSI-RS configuration information sent to the second network device. The second network device may determine, based on the cell identity information and/or the carrier configuration identifier, parameter information of a frequency band in which the current CSI-RS is located.

The cell identity information indicates a cell. One or more pieces of numerology information and/or frame structure information need to be configured for each cell identity, or one or more of the following information: subcarrier spacing information, cyclic prefix length information, frame structure time length information, and symbol quantity information need to be configured for each cell.

It should be noted that a naming manner and a value range of the cell identity information are not specifically limited in this embodiment of the present invention.

In an example, for a signaling configuration corresponding to the cell identity information, refer to Table 10.

TABLE 10

```
CarrierCommonConfig ={
  Cell_ID used to indicate cell identity information
  (and/or CarrierConfigID used to indicate carrier configuration
identification information, namely, a location at which a carrier
configuration ranks)
  CarrierConfig used to indicate parameter information of a carrier
}
CarrierConfig ={
  frequency used to indicate frequency band information
  numerologyConfig   INTEGER (0..31),
  (or frameStructureConfig  INTEGER (0..31),)
  (or
      SubcarrierSpacingConfig  ENUMERATED {15kHz, 30kHz,
60kHz,...},
      timeUintConfig          ENUMERATED {1ms, 0.5ms,
0.25ms,...}, or
                              ENUMERATED {subframe, slot,
                              mini
slot,...},
      CPConfig                ENUMERATED {NCP, ECP,...},
      symbolNumConfig         ENUMERATED
{14,12,7,6,4,3,2,...},  )
}
```

Alternatively, the first network device notifies the second network device of numerology information and/or frame structure information of one or more cells using physical layer signaling. Specifically, for example, DCI is used for indication. Public DCI is scrambled using a public temporary cell identity, for example, information about a cell 1 is scrambled using a cell ID 1, and information about a cell 2 is scrambled using a cell ID 2. The second network device is notified of cell identity information that needs to be received, so that the second network device receives DCI scrambled using the cell identity information. The second network device may learn of the numerology information and/or the frame structure information of one or more cells based on the information. The first network device adds the cell identity information to the CSI-RS configuration information sent to the second network device. The second network device determines, based on the cell identity information, parameter information of a frequency band in which the CSI-RS is located.

Alternatively, the first network device notifies, using higher layer signaling, the second network device of a numerology information and/or frame structure information corresponding to one or more cells, and then notifies the second network device of currently used numerology information and/or frame structure information by adding cell identity information to DCI signaling.

According to this embodiment of the present invention, the first network device may notify the second network device of parameter information of one or more cells in advance, and then add the cell identity information when configuring the CSI-RS. The second network device may determine, based on the cell identity information, the parameter information corresponding to the current CSI-RS, so as to determine a location of the resource in which the CSI-RS is located, and further receive the CSI-RS to perform CSI measurement.

Figure 3:
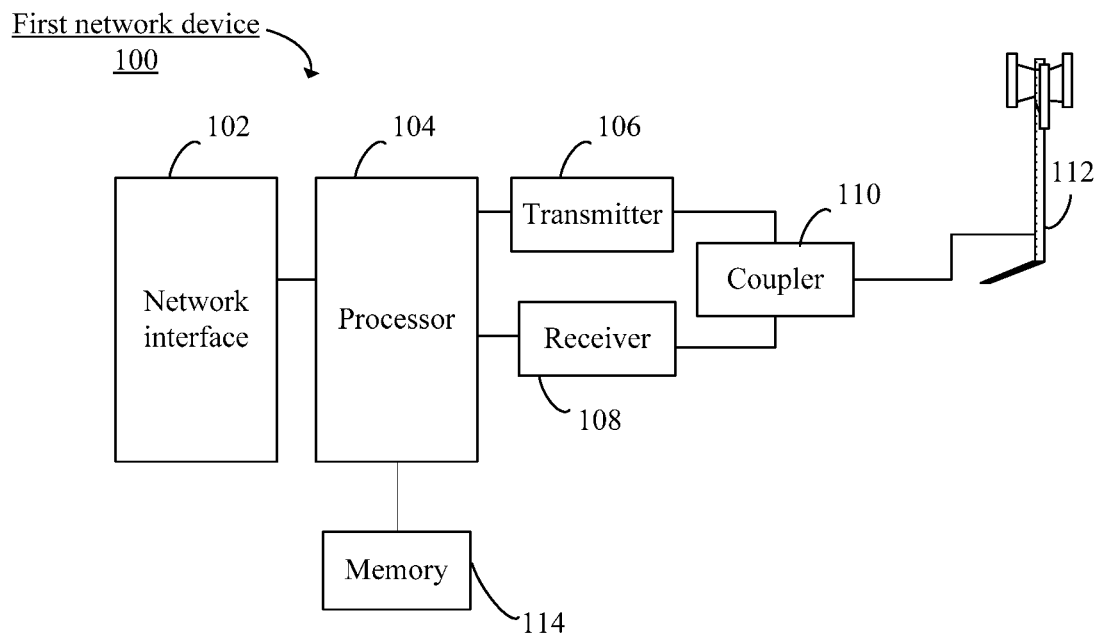
FIG. 3 is a schematic structural diagram of a network device according to an embodiment of the present invention.

Based on a same inventive concept, an embodiment of the present invention further provides a first network device, configured to implement the method described in the embodiment in FIG. 2. As shown in FIG. 3, a first network device 100 may include a network interface 102, a processor 104, a transmitter 106, a receiver 108, a coupler 110, an antenna 112, and a memory 114. The transmitter 106 is configured to send a signal to another communications device, and the receiver 108 is configured to receive a signal sent by another communications device. The coupler 110 is connected to the transmitter 106 and the receiver 108, and may be configured to separate a sent signal from a received signal. The antenna 112 is connected to a front end of the coupler 110, and may be configured to transmit an electromagnetic signal to outer space or receive an electromagnetic signal from an outer environment. The memory 114 is coupled to the processor 104, and is configured to store various software programs and/or a plurality of groups of instructions. In specific implementation, the memory 114 may include a high-speed random access memory, and may also include a nonvolatile memory, such as one or more disk storage devices, flash memory devices, or other nonvolatile solid-state storage devices.

Specifically, the processor 104 is configured to generate parameter information of a resource in which a CSI reference signal is located, where the parameter information is used by the second network device to determine one or more of the following information of the resource in which the CSI reference signal is located: subcarrier spacing information, cyclic prefix length information, frame structure time length information, and symbol quantity information.

The transmitter 106 is configured to send the parameter information to the second network device.

In this embodiment of the present invention, the parameter information is used by the second network device to determine a pilot pattern of the CSI reference signal, or the parameter information is used by the second network device to determine a time domain and/or frequency domain resource occupied by the CSI reference signal.

In this embodiment of the present invention, that the transmitter 106 is configured to send the parameter information to the second network device includes:

sending the parameter information to the second network device using RRC signaling, MAC signaling, or DCI signaling; or sending parameter information indication information to the second network device using RRC signaling, MAC signaling, or DCI signaling, where the parameter information indication information is used by the second network device to determine the parameter information from a plurality of groups of parameter information.

In this embodiment of the present invention, the parameter information includes frequency domain indication information, and the frequency domain indication information indicates a frequency domain to which the parameter information is applicable.

In this embodiment of the present invention, the transmitter 106 is further configured to send frequency domain indication information corresponding to the parameter information to the second network device, where the frequency domain indication information indicates a frequency domain to which the parameter information is applicable.

In this embodiment of the present invention, the parameter information includes CSI reference signal identification information, and the CSI reference signal identification information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that correspond to a current serving cell of the second network device; or the CSI reference signal identification information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that are obtained during initial access of the second network device.

In this embodiment of the present invention, the parameter information includes cell identity information, and the cell identity information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that correspond to the cell identity information.

It should be noted that for content not mentioned in the embodiment in FIG. 3, refer to the embodiment in FIG. 2 and the foregoing content. Details are not described herein again.

In an actual application, the first network device 100 may be the TRP in FIG. 1, and may be configured to allocate a reference signal resource to user equipment.

Figure 4:
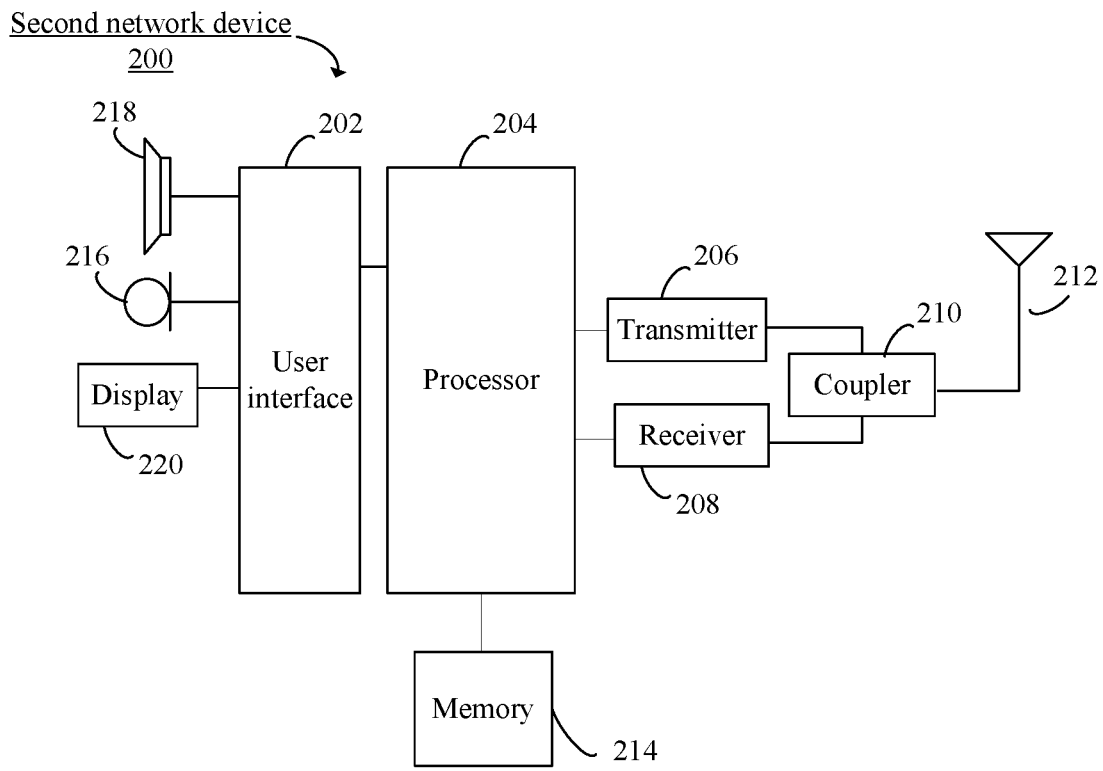
FIG. 4 is a schematic structural diagram of another network device according to an embodiment of the present invention.

Based on a same inventive concept, an embodiment of the present invention further provides a second network device, configured to implement the method described in the embodiment in FIG. 2. As shown in FIG. 4, a second network device 200 may include a network interface 202, a processor 204, a transmitter 206, a receiver 208, a coupler 210, an antenna 212, and a memory 214. The transmitter 206 is configured to send a signal to another communications device (such as a base station), and the receiver 208 is configured to receive a signal sent by another communications device (such as a base station). The coupler 210 is connected to the transmitter 206 and the receiver 208, and may be configured to separate a sent signal from a received signal. The antenna 212 is connected to a front end of the coupler 210, and may be configured to transmit an electromagnetic signal to outer space or receive an electromagnetic signal from an outer environment. The memory 214 is coupled to the processor 204, and is configured to store various software programs and/or a plurality of groups of instructions. In specific implementation, the memory 214 may include a high-speed random access memory, and may also include a nonvolatile memory, such as one or more disk storage devices, flash memory devices, or other nonvolatile solid-state storage devices.

Optionally, the second network device 200 may further include some input/output devices, such as an audio input/output circuit 218, a sensor 216, and a display 220, which may be configured to interact with a user, receive user input, or output a feedback to a user.

Specifically, the receiver 208 is configured to receive parameter information that is of a resource in which a channel state information CSI reference signal is located and that is sent by a first network device. The processor 204 is configured to determine, based on the parameter information, one or more of the following information of the resource in which the CSI reference signal is located: subcarrier spacing information, cyclic prefix length information, frame structure time length information, and symbol quantity information.

In this embodiment of the present invention, the processor 204 is further configured to determine a pilot pattern of the CSI reference signal based on the parameter information; or the processor 204 is further configured to determine, based on the parameter information, a time domain and/or frequency domain resource occupied by the CSI reference signal.

In this embodiment of the present invention, that the receiver 208 is configured to receive parameter information that is of a resource in which a channel state information CSI reference signal is located and that is sent by a first network device includes:

receiving the parameter information that is of the resource in which the CSI reference signal is located and that is sent by the first network device using radio resource control RRC signaling, Medium Access Control MAC signaling, or downlink control information DCI signaling; or receiving parameter information indication information that is sent by the first network device using RRC signaling, MAC signaling, or DCI signaling; and determining, based on the parameter information indication information, the parameter information of the resource in which the CSI reference signal is located from a plurality of groups of parameter information.

In this embodiment of the present invention, the parameter information includes frequency domain indication information, and the frequency domain indication information indicates a frequency domain to which the parameter information is applicable. After the receiver 208 receives the parameter information that is of the resource in which the channel state information CSI reference signal is located and that is sent by the first network device, the processor 204 is further configured to:

determine, based on the frequency domain indication information, the frequency domain to which the parameter information is applicable.

In this embodiment of the present invention, the receiver 208 is further configured to receive frequency domain indication information that corresponds to the parameter information and that is configured and sent by the first network device.

The processor 204 is further configured to determine, based on the frequency domain indication information, a frequency domain to which the parameter information is applicable.

In this embodiment of the present invention, the parameter information includes CSI reference signal identification information, and that the processor 204 is configured to determine, based on the parameter information, one or more of the following information of the resource in which the CSI reference signal is located: subcarrier spacing information, cyclic prefix length information, frame structure time length information, and symbol quantity information includes:

determining, based on the CSI reference signal identification information, one or more of the following information: subcarrier spacing information, cyclic prefix length information, frame structure time length information, and symbol quantity information of a serving cell as one or more of the following information of the resource in which the CSI reference signal is located: the subcarrier spacing information, the cyclic prefix length information, the frame structure time length information, and the symbol quantity information; or determining, by the second network device based on the CSI reference signal identification information, one or more of the following information: subcarrier spacing information, cyclic prefix length information, frame structure time length information, and symbol quantity information that are obtained during initial access as one or more of the following information of the resource in which the CSI reference signal is located: the subcarrier spacing information, the cyclic prefix length information, the frame structure time length information, and the symbol quantity information.

In this embodiment of the present invention, the parameter information includes cell identity information, and that the processor 204 is configured to determine, based on the parameter information, one or more of the following information of the resource in which the CSI reference signal is located: subcarrier spacing information, cyclic prefix length information, frame structure time length information, and symbol quantity information:

determining one or more of the following information: subcarrier spacing information, cyclic prefix length information, frame structure time length information, and symbol quantity information that correspond to the cell identity information as one or more of the following information of the resource in which the CSI reference signal is located: the subcarrier spacing information, the cyclic prefix length information, the frame structure time length information, and the symbol quantity information.

It should be noted that for content not mentioned in the embodiment in FIG. 4, refer to the embodiment in FIG. 2 and the foregoing content. Details are not described herein again.

Figure 5:
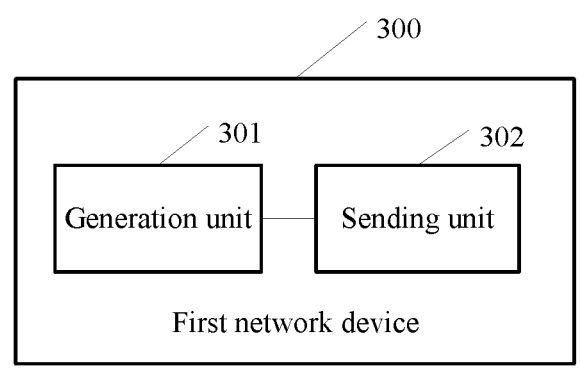
FIG. 5 is a schematic structural diagram of another network device according to an embodiment of the present invention.

Based on a same inventive concept, an embodiment of the present invention further provides another first network device. The first network device is configured to implement the method described in the embodiment in FIG. 2. As shown in FIG. 5, a first network device 300 may include a generation unit 301 and a sending unit 302.

The generation unit 301 is configured to generate parameter information of a resource in which a channel state information CSI reference signal is located, where the parameter information is used by the second network device to determine one or more of the following information of the resource in which the CSI reference signal is located: subcarrier spacing information, cyclic prefix length information, frame structure time length information, and symbol quantity information.

The sending unit 302 is configured to send the parameter information to the second network device.

In this embodiment of the present invention, the parameter information is used by the second network device to determine a pilot pattern of the CSI reference signal, or the parameter information is used by the second network device to determine a time domain and/or frequency domain resource occupied by the CSI reference signal.

In this embodiment of the present invention, that the sending unit 302 is configured to send the parameter information to the second network device includes:

sending the parameter information to the second network device using radio resource control RRC signaling, Medium Access Control MAC signaling, or downlink control information DCI signaling; or sending parameter information indication information to the second network device using RRC signaling, MAC signaling, or DCI signaling, where the parameter information indication information is used by the second network device to determine the parameter information from a plurality of groups of parameter information.

In this embodiment of the present invention, the parameter information includes frequency domain indication information, and the frequency domain indication information indicates a frequency domain to which the parameter information is applicable.

In this embodiment of the present invention, the sending unit 302 is further configured to:

send frequency domain indication information corresponding to the parameter information to the second network device, where the frequency domain indication information indicates a frequency domain to which the parameter information is applicable.

In this embodiment of the present invention, the parameter information includes CSI reference signal identification information, and the CSI reference signal identification information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that correspond to a current serving cell of the second network device; or the CSI reference signal identification information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that are obtained during initial access of the second network device.

In this embodiment of the present invention, the parameter information includes cell identity information, and the cell identity information indicates that one or more of the following information of the resource in which the CSI reference signal is located: the subcarrier spacing information, the cyclic prefix length information, the frame structure time length information, and the symbol quantity information is one or more of the following information: subcarrier spacing information, cyclic prefix length information, frame structure time length information, and symbol quantity information that correspond to the cell identity information.

It should be noted that for specific implementation of each function module in the first network device 300, refer to the embodiment in FIG. 2 and the foregoing content. Details are not described herein again.

In an actual application, the first network device 300 may be the TRP in FIG. 1, and may be configured to allocate a reference signal resource to user equipment. In an actual application, the first network device 300 may alternatively be another network entity, for example, a management node corresponding to a plurality of groups of transceiver points. This is not limited herein.

Figure 6:
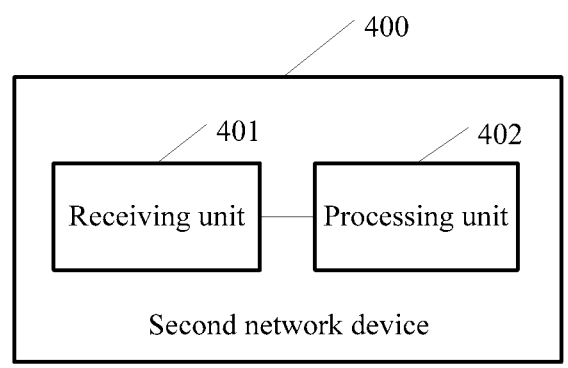
FIG. 6 is a schematic structural diagram of another network device according to an embodiment of the present invention.

Based on a same inventive concept, an embodiment of the present invention further provides a second network device. As shown in FIG. 6, a second network device 400 may include a receiving unit 401 and a processing unit 402.

The receiving unit 401 may be configured to receive parameter information that is of a resource in which a channel state information CSI reference signal is located and that is sent by a first network device.

The processing unit 402 is configured to determine, based on the parameter information, one or more of the following information of the resource in which the CSI reference signal is located: subcarrier spacing information, cyclic prefix length information, frame structure time length information, and symbol quantity information.

In this embodiment of the present invention, the processing unit 402 is further configured to:

determine a pilot pattern of the CSI reference signal based on the parameter information; or determine, based on the parameter information, a time domain and/or frequency domain resource occupied by the CSI reference signal.

In this embodiment of the present invention, that the receiving unit 401 may be configured to receive parameter information that is of a resource in which a channel state information CSI reference signal is located and that is sent by a first network device includes:

receiving the parameter information that is of the resource in which the CSI reference signal is located and that is sent by the first network device using radio resource control RRC signaling, Medium Access Control MAC signaling, or downlink control information DCI signaling; or receiving parameter information indication information that is sent by the first network device using RRC signaling, MAC signaling, or DCI signaling; and determining, based on the parameter information indication information, the parameter information of the resource in which the CSI reference signal is located from a plurality of groups of parameter information.

In this embodiment of the present invention, the parameter information includes frequency domain indication information, and the frequency domain indication information indicates a frequency domain to which the parameter information is applicable. After the receiving unit 401 receives the parameter information that is of the resource in which the channel state information CSI reference signal is located and that is sent by the first network device, the processing unit 402 is further configured to determine, based on the frequency domain indication information, the frequency domain to which the parameter information is applicable.

In this embodiment of the present invention, the receiving unit 401 is further configured to:

receive frequency domain indication information that corresponds to the parameter information and that is configured and sent by the first network device; and the processing unit 402 is further configured to determine, based on the frequency domain indication information, a frequency domain to which the parameter information is applicable.

In this embodiment of the present invention, the parameter information includes CSI reference signal identification information, and that the processing unit 402 is configured to determine, based on the parameter information, one or more of the following information of the resource in which the CSI reference signal is located: subcarrier spacing information, cyclic prefix length information, frame structure time length information, and symbol quantity information includes:

determining, based on the CSI reference signal identification information, one or more of the following information: subcarrier spacing information, cyclic prefix length information, frame structure time length information, and symbol quantity information of a serving cell as one or more of the following information of the resource in which the CSI reference signal is located: the subcarrier spacing information, the cyclic prefix length information, the frame structure time length information, and the symbol quantity information; or determining, by the second network device based on the CSI reference signal identification information, one or more of the following information: subcarrier spacing information, cyclic prefix length information, frame structure time length information, and symbol quantity information that are obtained during initial access as one or more of the following information of the resource in which the CSI reference signal is located: the subcarrier spacing information, the cyclic prefix length information, the frame structure time length information, and the symbol quantity information.

In this embodiment of the present invention, the parameter information includes cell identity information, and that the processing unit 402 is configured to determine, based on the parameter information, one or more of the following information of the resource in which the CSI reference signal is located: subcarrier spacing information, cyclic prefix length information, frame structure time length information, and symbol quantity information includes:

determining one or more of the following information: subcarrier spacing information, cyclic prefix length information, frame structure time length information, and symbol quantity information that correspond to the cell identity information as one or more of the following information of the resource in which the CSI reference signal is located: the subcarrier spacing information, the cyclic prefix length information, the frame structure time length information, and the symbol quantity information.

It should be noted that for specific implementation of each function module in the second network device 400, refer to the embodiment in FIG. 2 and the foregoing content. Details are not described herein again.

In an actual application, the second network device 400 may be the user equipment in FIG. 1.

In addition, an embodiment of the present invention further provides a communications system. The communications system may include a first network device and a second network device. The first network device may be configured to generate parameter information of a resource in which a CSI reference signal is located and send the parameter information to the second network device. The parameter information is used by the second network device to determine one or more of the following information of the resource in which the CSI reference signal is located: subcarrier spacing information, cyclic prefix length information, frame structure time length information, and symbol quantity information. The second network device may be configured to receive the parameter information, and determine, based on the parameter information, one or more of the following information of the resource in which the CSI reference signal is located: the subcarrier spacing information, the cyclic prefix length information, the frame structure time length information, and the symbol quantity information.

In some embodiments, the first network device may be the first network device 100 described in the embodiment in FIG. 3, and the second network device may be the second network device 200 described in the embodiment in FIG. 4. In some embodiments, the first network device may alternatively be the first network device 300 described in the embodiment in FIG. 5, and the second network device may alternatively be the second network device 400 described in the embodiment in FIG. 6. It should be noted that the first network device may alternatively be the first network device described in all the foregoing content, and the second network device may be the second network device described in all the foregoing content.

Persons skilled in the art can make various modifications and variations to the embodiments of the present invention without departing from the spirit and scope of the embodiments of the present invention. This application is intended to cover these modifications and variations provided that they fall within the scope of protection defined by the following claims and their equivalent technologies.

What is claimed is:

1. A configuration method for channel state information measurement, comprising:

generating, by a first network device, parameter information of a resource in which a channel state information (CSI) reference signal is located, wherein the parameter information includes frequency domain indication information of the CSI reference signal and one or more parameters of: subcarrier spacing information of the resource, cyclic prefix length information of the resource, frame structure time length information of the resource, or symbol quantity information of the resource, and wherein the frequency domain indication information indicates a frequency band in which the CSI reference signal is located; and sending, by the first network device, the parameter information to the second network device.

2. The method according to claim 1, wherein the parameter information indicates a pilot pattern of the CSI reference signal, or the parameter information indicates at least one of a time domain or frequency domain resource occupied by the CSI reference signal.

3. The method according to claim 1, wherein the sending, by the first network device, the parameter information to the second network device comprises:

sending, by the first network device, the parameter information to the second network device using radio resource control (RRC) signaling, Medium Access Control (MAC) signaling, or downlink control information (DCI) signaling; or sending, by the first network device, parameter information indication information to the second network device using RRC signaling, MAC signaling, or DCI signaling, wherein the parameter information indication information is used by the second network device to determine the parameter information from a plurality of groups of parameter information.

4. The method according to claim 1, wherein the one or more parameters comprise subcarrier spacing information of the resource.

5. The method according to claim 1, wherein the parameter information comprises cell identity information, and the cell identity information indicates that one or more of: the subcarrier spacing information of the resource, the cyclic prefix length information of the resource, the frame structure time length information of the resource, or the symbol quantity information of the resource is one or more of: subcarrier spacing information, cyclic prefix length information, frame structure time length information, or symbol quantity information that correspond to the cell identity information.

6. The method according to claim 1, wherein the parameter information comprises CSI reference signal identification information, and the CSI reference signal identification information indicates that one or more of: the subcarrier spacing information of the resource, the cyclic prefix length information of the resource, the frame structure time length information of the resource, or the symbol quantity information of the resource is one or more of: subcarrier spacing information, cyclic prefix length information, frame structure time length information, or symbol quantity information that correspond to a current serving cell of the second network device; or wherein the CSI reference signal identification information indicates that one or more of: the subcarrier spacing information of the resource, the cyclic prefix length information of the resource, the frame structure time length information of the resource, or the symbol quantity information of the resource is one or more of: subcarrier spacing information, cyclic prefix length information, frame structure time length information, or symbol quantity information that are obtained during initial access of the second network device.

7. A configuration method for channel state information measurement, comprising:

receiving, by a second network device, parameter information of a resource in which a channel state information (CSI) reference signal is located from a first network device, wherein the parameter information includes frequency domain indication information of the CSI reference signal and one or more parameters of: subcarrier spacing information of the resource, cyclic prefix length information of the resource, frame structure time length information of the resource, or symbol quantity information of the resource, and wherein the frequency domain indication information indicates a frequency band in which the CSI reference signal is located; and receiving, by the second network device, the CSI reference signal on the frequency band based on the one or more parameters.

8. The method according to claim 7, wherein the one or more parameters comprise subcarrier spacing information of the resource.

9. The method according to claim 7, wherein the method further comprises:

determining, by the second network device, a pilot pattern of the CSI reference signal based on the parameter information; or determining, by the second network device based on the parameter information, at least one of a time domain or frequency domain resource occupied by the CSI reference signal.

10. The method according to claim 7, wherein the receiving, by the second network device, the parameter information of the resource in which the CSI reference signal is located from the first network device comprises:

receiving, by the second network device, the parameter information that is of the resource in which the CSI reference signal is located and that is sent by the first network device using radio resource control (RRC) signaling, Medium Access Control (MAC) signaling, or downlink control information (DCI) signaling; or receiving, by the second network device, parameter information indication information from the first network device using RRC signaling, MAC signaling, or DCI signaling; and determining, based on the parameter information indication information, the parameter information of the resource in which the CSI reference signal is located from a plurality of groups of parameter information.

11. The method according to claim 7, wherein the parameter information comprises CSI reference signal identification information, and the determining, by the second network device based on the parameter information, one or more of: subcarrier spacing information of the resource, cyclic prefix length information of the resource, frame structure time length information of the resource, or symbol quantity information of the resource comprises:

determining, by the second network device based on the CSI reference signal identification information, one or more of: subcarrier spacing information, cyclic prefix length information, frame structure time length information, or symbol quantity information of a serving cell as one or more of: the subcarrier spacing information of the resource, the cyclic prefix length information of the resource, the frame structure time length information of the resource, or the symbol quantity information of the resource; or determining, by the second network device based on the CSI reference signal identification information, one or more of: subcarrier spacing information, cyclic prefix length information, frame structure time length information, or symbol quantity information that are obtained during initial access as one or more of: the subcarrier spacing information of the resource, the cyclic prefix length information of the resource, the frame structure time length information of the resource, or the symbol quantity information of the resource.

12. The method according to claim 7, wherein the parameter information comprises cell identity information, and the determining, by the second network device based on the parameter information, one or more of: subcarrier spacing information of the resource, cyclic prefix length information of the resource, frame structure time length information of the resource, or symbol quantity information of the resource comprises:

determining, by the second network device, one or more of: subcarrier spacing information, cyclic prefix length information, frame structure time length information, or symbol quantity information that correspond to the cell identity information as one or more of: the subcarrier spacing information of the resource, the cyclic prefix length information of the resource, the frame structure time length information of the resource, or the symbol quantity information of the resource.

13. A network device, wherein the network device is a second network device, and the second network device comprises a processor and a receiver, wherein:

the receiver is configured to:
receive parameter information of a resource in which a channel state information (CSI) reference signal is located from a first network device, wherein the parameter information includes frequency domain indication information of the CSI reference signal and one or more parameters of: subcarrier spacing information of the resource, cyclic prefix length information of the resource, frame structure time length information of the resource, or symbol quantity information of the resource, and wherein the frequency domain indication information indicates a frequency band in which the CSI reference signal is located; and
receive the CSI reference signal on the frequency band based on the one or more parameters.

14. The network device according to claim 13, wherein the one or more parameters comprise subcarrier spacing information of the resource.

15. The network device according to claim 13, wherein the processor is further configured to:
determine, based on the CSI reference signal identification information, one or more of: subcarrier spacing information, cyclic prefix length information, frame structure time length information, or symbol quantity information of a serving cell as one or more of: the subcarrier spacing information of the resource, the cyclic prefix length information of the resource, the frame structure time length information of the resource, or the symbol quantity information of the resource; or
determine, by the second network device based on the CSI reference signal identification information, one or more of: subcarrier spacing information, cyclic prefix length information, frame structure time length information, or symbol quantity information that are obtained during initial access as one or more of: the subcarrier spacing information of the resource, the cyclic prefix length information of the resource, the frame structure time length information of the resource, or the symbol quantity information of the resource.

16. The network device according to claim 13, wherein the processor is further configured to determine a pilot pattern of the CSI reference signal based on the parameter information; or
wherein the processor is further configured to determine, based on the parameter information, at least one of a time domain or frequency domain resource occupied by the CSI reference signal.

17. The network device according to claim 13, wherein:
the receiver is configured to receive the parameter information that is of the resource in which the CSI reference signal is located from the first network device using radio resource control (RRC) signaling, Medium Access Control (MAC) signaling, or downlink control information (DCI) signaling; or
the receiver is configured to:
receive parameter information indication information from the first network device using RRC signaling, MAC signaling, or DCI signaling; and
determine, based on the parameter information indication information, the parameter information of the resource in which the CSI reference signal is located from a plurality of groups of parameter information.

* * * * *